United States Patent Office 3,247,248
Patented Apr. 19, 1966

3,247,248
PREPARATION OF UNSATURATED MONO-
CARBOXYLIC ACIDS
Victor A. Sims, Bayonne, and James F. Vitcha, New Providence, N.J., assignors, by mesne assignments, to Cumberland Chemical Corporation, New York, N.Y., a corporation of Delaware
No Drawing. Filed Dec. 26, 1961, Ser. No. 162,224
17 Claims. (Cl. 260—526)

This invention relates to the preparation of unsaturated monocarboxylic acids and is more particularly concerned with the preparation of acrylic acid and methacrylic acid by a catalytic process involving the reaction of acetic acid or propionic acid and formaldehyde.

It is an object of this invention to provide an improved method and process for the preparation of acrylic acid and methacrylic acid.

A further object of this invention is to provide a vapor phase catalytic process for the production of unsaturated monocarboxylic acids, such as acrylic acid and methacrylic acid.

A still further object is to provide catalysts useful for promoting the reaction of acetic acid and formaldehyde, and for promoting the reaction of propionic acid and formaldehyde.

These and other objects, as well as other advantages of this invention will become apparent or will be clarified or detailed specifically in the following description.

In accordance with the invention acrylic acid and methacrylic acid are prepared by a catalytic vapor phase reaction of acetic acid and propionic acid, respectively, with formaldehyde.

In general, a vapor or gas phase mixture of the saturated monocarboxylic acid, acetic acid or propionic acid, and formaldehyde is prepared. A mixture of a formaldehyde containing material and the saturated acid can be vaporized to form the vapor phase mixture. The vapor phase mixture may include some water or alcohol, which may be present in the starting materials. The vapor mixture is heated to and maintained at the reaction temperature. The catalyst is heated and maintained at the reaction temperature. The heated vapor mixture is passed to or through the catalyst, so as to contact the catalyst. The gas mixture obtained after the vapor mixture has contacted the catalyst contains the product unsaturated acid, and unreacted saturated acid, and unreacted formaldehyde, as well as water produced in the reaction and other by-products.

Any suitable technique may be used for the recovery of the unsaturated acid. In general, the reaction mixture is condensed, and the product is recovered by distillation. It is also desirable to recover and reuse unreacted acetic acid or propionic acid and unreacted formaldehyde. Because of the ease of polymerization of unsaturated acids, acrylic acid and methacrylic acid, it is desirable to utilize a polymerization inhibitor in the mixture being distilled.

The reaction of this invention may be conducted in a variety of ways; that is, continuous process or batch process techniques may be employed. In a preferred embodiment, the process is conducted with an excess of saturated acid. A continuous process, wherein the unreacted materials are recovered and recycled to the starting materials mixture or feed stock, is preferred.

The reaction takes place over a wide temperature range; temperatures within the range of about 300° C. to about 500° C. are satisfactory. More desirable and advantageous results are obtained when the reaction is conducted at a temperature within the range from about 350° C. to about 425° C. The reaction is normally conducted at atmospheric pressure, although higher or lower pressures may be used. Elevated pressures may be desirable because of the shorter catalyst contact time.

The space velocity of the feed mixture, over the catalyst, may be varied over wide limits. In this specification the feed mixture space velocity over the catalyst is expressed as total volume of gaseous feed mixture per unit time per unit volume of catalyst. The total volume of gaseous feed mixture is based on the total moles of feed mixture materials, i.e., one mole of feed mixture material is equal to 24 liters of gas, the volume of one mole of an ideal gas at room temperature and one atmosphere pressure. A useful space velocity range includes from about 100 liters of gaseous feed mixture per hour per liter of catalyst to about 6000 liters of gaseous feed mixture per hour per liter of catalyst. A space velocity within the range from about 100 liters per hour per liter of catalyst to about 1200 liters per hour per liter of catalyst, is preferred when operating at atmospheric pressure. When operating at a pressure of about 100 p.s.i.g., a space velocity within the range from about 1000 liters per hour per liter of catalyst to about 6000 liters per hour per liter of catalyst, is preferred.

The mole ratio of saturated acid, acetic or propionic, to formaldehyde, in the feed mixture, can be varied within a range from about 1 to 1 to about 50 to 1, or higher. Generally, acid to formaldehyde mole ratios within the range from about 5 to 1 to about 15 to 1, are preferred.

While monomeric formaldehyde can be used in the procedures of this invention, it is generally not readily available, because of the polymerization and condensation properties of formaldehyde. Any of the various types of formaldehyde containing materials can be used; for example, paraformaldehyde, trioxane, aqueous solutions of formaldehyde and alcoholic solutions of formaldehyde. While alcoholic solutions of formaldehyde can be used, they may have some disadvantages such as side reactions, with the formation of by-products when substantial amounts of alcohol are present in the feed mixture. An aqueous formaldehyde containing material such as formalin is preferred in the practice of this invention. From whatever source the formaldehyde is obtained, it is preferred that the formaldehyde be utilized in the reaction as a gas or vapor at the preferred operating temperatures.

The acetic acid used is the normally available commercial glacial acetic acid, while the propionic acid may be any commercial grade of propionic acid.

While limited amounts of water or alcohol may be present in the reaction mixture, there is ordinarily no major advantage in conducting the reaction in the presence of solvents.

As previously indicated a catalyst is used in this reaction of a saturated acid and formaldehyde. The following materials are representative of catalysts that are useful.

Catalysts include synthetic alkali metal alumino-silicates, natural alkali metal aluminosilicates, synthetic alkaline earth metal aluminosilicates, natural alkaline earth metal aluminosilicates, alkali metal hydroxides on synthetic aluminosilicates, alkali metal hydroxides on natural aluminosilicates, alkaline earth metal hydroxides on synthetic aluminosilicates, alkaline earth metal hydroxides on natural aluminosilicates, alkali metal hydroxides on silica gel, alkaline earth metal hydroxides on silica gel, sodium silicate on silica gel, potassium silicate on silica gel, molybdenum oxide on silica gel, silica gel, synthetic manganese aluminosilicate, natural manganese aluminosilicate, synthetic cobalt aluminosilicate, natural cobalt aluminosilicate, synthetic zinc aluminosilicate, and natural zinc aluminosilicate.

Aluminosilicates are the preferred catalysts for this invention. The aluminosilicates may be natural or synthetic. Aluminosilicates usually contain a chemically combined metal and silica and alumina. Specific aluminosilicates are the alkali metal and alkaline earth metal aluminosilicates, i.e. those where the metal is selected from sodium, potassium, rubidium, magnesium, calcium, strontium and barium, and the aluminosilicates of manganese, cobalt and zinc. Synthetic aluminosilicates may be prepared by a variety of methods, for example: (1) dehydrating silica alumina hydrogels and then introducing or exchanging a cation or metal; (2) coprecipitating metal silicates on silica gel; (3) impregnating a natural aluminosilicate with an active cation or metal.

Attapulgite, a natural aluminosilicate, and other similar minerals or clays, treated or untreated, may be used as catalysts.

Generally, the aluminosilicates or synthetic zeolites having a large degree of porosity and a large amount of surface area are desirable. A synthetic sodium aluminosilicate manufactured by the Permutit Company and sold under the name "Decalso" is a very effective type of aluminosilicate. "Decalso" may be treated by an ion exchange process to give a series of very active catalysts. "Decalso" is a synthetic aluminosilicate base ion-exchange material, and is used mainly for water softening.

Aluminosilicates of potassium, rubidium, magnesium, calcium, strontium, barium, manganese, cobalt and zinc can be readily prepared from another aluminosilicate such as sodium aluminosilicate, as "Decalso," by ion exchange techniques. For example, the aluminosilicate can be treated with an aqueous salt solution containing the cation desired. Aqueous solutions of the appropriate metal salt, as acetate, chloride, sulfate, or nitrate, may be used.

Inorganic compounds impregnated on a silica gel carrier are useful catalysts. Illustrative of compounds that may be impregnated on silica gel are: sodium hydroxide, potassium hydroxide, rubidium hydroxide, cesium hydroxide, barium hydroxide, sodium silicate, potassium silicate, and molybdenum oxide.

Examples 1 to 3 which follow illustrate various methods of preparing catalysts for use in this invention.

EXAMPLE 1

Five hundred grams of a synthetic sodium aluminosilicate "Decalso" were packed into a long glass tube. Six liters of a 5% calcium acetate water solution was passed through the bed from the bottom at a rate of about 250 cubic centimeters per hour. The bed was then washed with about 12 liters of distilled water to remove any extraneous material or adsorbed salts. The calcium aluminosilicate was then drained, suction filtered, and dried in a forced draft oven at 375° C. for about 24 hours.

Other useful catalysts are the alkali metal hydroxides supported by a silica gel carrier. The alkali metal hydroxide can be about 0.5% to 10% by weight of the silica gel carrier.

The following Example 2 of preparing potassium hydroxide on silica gel is illustrative of the method used to prepare these catalysts; the other alkali metal hydroxide catalysts are prepared by a similar procedure.

EXAMPLE 2

A solution of 2.4 grams of 87% potassium hydroxide and 90 grams of water was prepared. This solution was poured on 200 grams of 6/16 mesh silica gel particles with vigorous stirring. The resulting mass was warmed while being mixed. The mass was heated for 2 hours, after which it was placed in a forced draft air oven and dried for 3 hours at 375° C. The fines were screened from the resulting product and discarded. The catalyst was 1% by weight potassium hydroxide on silica gel.

The procedures used in Example 2 and the following Example 3 are representative of the techniques useful for impregnating a catalyst carrier as silica gel, and aluminosilicate.

EXAMPLE 3

The various impregnated inorganic compounds on silica gel can in general be prepared by the procedures outlined in Example 2. Molybdenum oxide on silica gel was prepared by dissolving 12.5 grams of ammonium molybdate in 70 ml. of water. The solution was mixed with 90 grams 14/20 silica gel. The mixture was then dried at 400° C. for 24 hours.

In the following Examples 4 through 9, similar procedures were used. Equipment was provided for feeding a gaseous mixture of saturated acid and formaldehyde at a controlled rate through a fixed catalyst bed. The system included a calibrated reservoir, metering pump, vaporizer, catalyst bed tube, condensing apparatus, and wet test meter.

In operation, the mixture of acetic acid and formaldehyde, or the mixture of propionic acid and formaldehyde, was fed by the metering pump from the calibrated reservoir to the vaporizer at a predetermined and controlled rate. The vaporizer was electrically heated by a suitable furnace, and was connected to an electrically heated cylindrical reactor tube; the vaporizer and the reactor tube were fitted with thermocouple wells. Both the vaporizer and the reactor tube were brought to operating temperature while being flushed with a stream of nitrogen. When the required temperature was reached, the nitrogen flow was discontinued, and the acid-formaldehyde mixture was pumped to the vaporizer. The gases or vapors leaving the catalyst bed were condensed, to give acrylic acid, acetic acid, and some formaldehyde in the case of acetic acid; methacrylic acid, propionic acid, and some formaldehyde were obtained in the case of propionic acid. In both cases, water and a small amount of by-products were recovered. Non-condensables and decomposition products which were very small or nil were measured by passage through the wet gas meter. In the first instance, acrylic acid, and unreacted acetic acid, and unreacted formaldehyde were recovered by distillation. In the second case, methacrylic acid, and unreacted propionic acid, and unreacted formaldehyde were recovered by distillation. The unreacted saturated acid and formaldehyde were suitable for return to the feed mixture, provided that the other materials in the feed mixture were adjusted to give the desired ratios of starting materials. It may be desirable to utilize a polymerization inhibitor in the feed mixture when operating under the procedures of this invention. A polymerization inhibitor was used during the distillation and recovery of the acrylic acid or methacrylic acid.

The following Examples 4 through 9 are illustrative of the reaction of acetic acid or propionic acid and formaldehyde. In these examples, including the tables and table headings, uniform nomenclature and uniform descriptive terminology has been used. Reaction temperature is expressed in degrees centigrade; space velocity is in liters of gas per hour per liter of catalyst; percent conversion is based on the amount of formaldehyde introduced that has reacted; percent yield is based on the amount of unsaturated acid produced and the amount of unreacted formaldehyde recovered. The source or type of formaldehyde used is indicated. Figures relating to unreacted acetic acid have not been given since very little of the acetic acid is lost by side reactions and it is efficiently recovered in the condensing system. Catalyst preparation techniques have been described in the specification material on catalysts. Unless otherwise indicated the catalyst bed used in these examples contained one hundred cubic centimeters of catalyst. Glacial acetic acid or commercial propionic acid was used in all of the runs.

EXAMPLE 4

In this example a vapor mixture of acetic acid and formaldehyde was passed through a catalyst bed; the catalyst was a calcium aluminosilicate. The calcium aluminosilicate was prepared from the sodium form—"Decalso." Various forms of formaldehyde were used to prepare the acetic acid/formaldehyde solution in the calibrated reservoir. Included were formalin, paraformaldehyde, "Methyl Formcel" and trioxane. "Methyl Formcel" is a 55% solution of formaldehyde in methanol. The results of representative runs are summarized and tabulated in Table I.

*Table I.—Preparation of acrylic acid*

| Run number | Formaldehyde | Acetic acid to formaldehyde, mole ratio | Reaction temperature | Space velocity | Conversion, percent | Yield, percent |
|---|---|---|---|---|---|---|
| 1 | Formalin | 20.00 | 375 | 200 | 63 | 100 |
| 2 | ___do___ | 15.00 | 385 | 285 | 59 | 73 |
| 3 | ___do___ | 10.00 | 375 | 270 | 58 | 98 |
| 4 | ___do___ | 10.00 | 400 | 800 | 52 | 88 |
| 5 | ___do___ | 7.50 | 375 | 265 | 47 | 88 |
| 6 | ___do___ | 7.50 | 425 | 780 | 40 | 100 |
| 7 | ___do___ | 5.00 | 375 | 230 | 37 | 71 |
| 8 | ___do___ | 2.50 | 375 | 480 | 26 | 63 |
| 9 | ___do___ | 1.00 | 375 | 240 | 11 | 18 |
| 10 | Paraformaldehyde | 20.00 | 385 | 390 | 57 | 68 |
| 11 | ___do___ | 15.00 | 385 | 390 | 56 | 70 |
| 12 | ___do___ | 10.00 | 350 | 225 | 51 | 88 |
| 13 | ___do___ | 7.50 | 385 | 465 | 45 | 61 |
| 14 | Trioxane | 10.00 | 385 | 385 | 51 | 67 |
| 15 | ___do___ | 5.00 | 385 | 435 | 41 | 56 |
| 16 | Methyl Formcel | 10.00 | 385 | 410 | 42 | 69 |

EXAMPLE 5

In this example synthetic barium aluminosilicate was used as the catalyst. It was prepared from the sodium form "Decalso" by ion exchange. The results of a series of runs are summarized and tabulated in Table II.

*Table II.—Preparation of acrylic acid*

| Run number | Formaldehyde | Acetic acid to formaldehyde, mole ratio | Reaction temperature | Space velocity | Conversion, percent | Yield, percent |
|---|---|---|---|---|---|---|
| 1 | Formalin | 10.0 | 385 | 480 | 49 | 86 |
| 2 | ___do___ | 5.0 | 400 | 490 | 35 | 55 |
| 3 | Paraformaldehyde | 9.0 | 380 | 360 | 57 | 89 |
| 4 | ___do___ | 5.0 | 400 | 430 | 40 | 63 |

EXAMPLE 6

In this example a series of runs were made using potassium hydroxide on silica gel or rubidium hydroxide on silica gel as the catalyst. Results are summarized and tabulated in Table III. Catalysts were 1.0% potassium hydroxide or 1.0% rubidium hydroxide, based on total catalyst weight.

EXAMPLE 7

Acrylic acid was prepared by utilizing formalin as the source of formaldehyde, operating at a mole ratio of acetic acid to formaldehyde of 10 to 1, at a reaction temperature of 385° C., and with a space velocity of about 400 liters per hour per liter of catalyst. Under these conditions the following materials had catalytic activity: *synthetic aluminosilicates prepared from "Decalso"*—sodium aluminosilicate, potassium aluminosilicate, rubidium aluminosilicate, magnesium aluminosilicate, calcium aluminosilicate, strontium aluminosilicate, barium aluminosilicate, manganese aluminosilicate, cobalt aluminosilicate, and zinc aluminosilicate; *synthetic aluminosilicates*—barium aluminosilicate prepared from silica-alumina hydrogel; precipitated calcium-aluminosilicate on silica gel; *natural aluminosilicates*—attapulgite, magnesium aluminosilicate called "Filtrol"; *impregnated materials*—calcium oxide on attapulgite, rubidium hydroxide on attapulgite, sodium hydroxide on silica gel, potassium hydroxide on silica gel, rubidium hydroxide on silica gel, cesium hydroxide on silica gel, barium hydroxide on silica gel; sodium silicate on silica gel, and potassium silicate on silica gel; *other materials*—molybdenum oxide on silica gel and silica gel.

EXAMPLE 8

In this example methacyrlic acid was prepared from formaldehyde and commercial grade propionic acid. Results are summarized and tabulated in Table IV. Catalysts were 1% potassium hydroxide on silica gel; and a form of calcium aluminosilicate—prepared from "Decalso."

*Table III.—Preparation of acrylic acid*

| Run number | Catalyst | Formaldehyde | Acetic acid to formaldehyde, mole ratio | Reaction temperature | Space velocity | Conversion, percent | Yield, percent |
|---|---|---|---|---|---|---|---|
| 1 | RbOH | Formalin | 10.00 | 385 | 425 | 48 | 94 |
| 2 | RbOH | Paraformaldehyde | 10.00 | 325 | 380 | 28 | 96 |
| 3 | RbOH | ___do___ | 7.5 | 360 | 405 | 35 | 63 |
| 4 | KOH | Formalin | 10.00 | 350 | 280 | 40 | 71 |
| 5 | KOH | Paraformaldehyde | 10.00 | 350 | 350 | 39 | 54 |

Table IV.—Preparation of methacrylic acid

| Run number | Catalyst | Formaldehyde | Propionic acid to formaldehyde, mole ratio | Reaction temperature | Space velocity | Conversion, percent | Yield, percent |
|---|---|---|---|---|---|---|---|
| 1 | KOH | Formalin | 10.0 | 325 | 235 | 49 | 89 |
| 2 | KOH | do | 10.0 | 350 | 265 | 68 | 80 |
| 3 | KOH | do | 10.0 | 365 | 265 | 53 | 59 |
| 4 | KOH | do | 5.0 | 385 | 275 | 38 | 40 |
| 5 | KOH | Paraformaldehyde | 10.0 | 330 | 150 | 41 | 45 |
| 6 | CaAS [1] | Formalin | 10.0 | 325 | 245 | 24 | 76 |
| 7 | CaAS | do | 10.0 | 370 | 260 | 45 | 62 |
| 8 | CaAS | do | 5.0 | 370 | 225 | 20 | 29 |
| 9 | CaAS | Paraformaldehyde | 10.0 | 385 | 315 | 34 | 38 |

[1] CaAS=calcium aluminosilicate.

EXAMPLE 9

In this example acrylic acid was prepared from formaldehyde and glacial acetic acid. The reaction was run under pressure. Catalysts were barium aluminosilicate and calcium aluminosilicate from "Decalso." Results are summarized and tabulated in Table V.

Table V.—Preparation of acrylic acid

| Run number | Catalyst | Formaldehyde | Acetic acid to formaldehyde, mole ratio | Reaction temperature | Reaction pressure, p.s.i.g. | Space velocity | Conversion, percent | Yield, percent |
|---|---|---|---|---|---|---|---|---|
| 1 | BaAS [1] | Formalin | 7.5:1 | 385 | 100 | 3,100 | 42 | 98 |
| 2 | BaAS | do | 7.5:1 | 385 | 100 | 2,300 | 46 | 91 |
| 3 | BaAS | do | 7.5:1 | 385 | 100 | 1,600 | 54 | 83 |
| 4 | BaAS | do | 7.5:1 | 390 | 100 | 2,300 | 50 | 85 |
| 5 | BaAS | do | 7.5:1 | 390 | 100 | 3,100 | 50 | 89 |
| 6 | CaAS [2] | do | 5:1 | 385 | 100 | 2,000 | 39 | 71 |
| 7 | CaAS | do | 15:1 | 380 | 100 | 3,200 | 65 | 100 |
| 8 | CaAS | do | 15:1 | 380 | 100 | 2,400 | 48 | 98 |
| 9 | CaAS | do | 15:1 | 390 | 100 | 2,400 | 49 | 80 |
| 10 | CaAS | do | 15:1 | 390 | 100 | 3,100 | 51 | 90 |
| 11 | BaAS | do | 10:1 | 385 | 100 | 3,200 | 40 | 100 |
| 12 | BaAS | do | 10:1 | 385 | 100 | 1,700 | 59 | 95 |
| 13 | CaAS | do | 10:1 | 380 | 100 | 3,300 | 32 | 98 |
| 14 | CaAS | do | 10:1 | 385 | 100 | 3,400 | 40 | 88 |
| 15 | CaSA | do | 10:1 | 380 | 100 | 2,300 | 43 | 90 |
| 16 | CaAS | do | 10:1 | 390 | 100 | 3,200 | 40 | 95 |
| 17 | CaAS | do | 10:1 | 390 | 100 | 2,300 | 43 | 85 |

[1] BaAS=barium aluminosilicate.
[2] CaAS=calcium aluminosilicate.

While preferred embodiments of this invention have been described, it is to be understood that widely different modifications of the invention may be made without departing from the scope and spirit of the invention. The invention is not to be limited by the foregoing examples and details of description except as defined by the following claims.

We claim:

1. A process which comprises reacting formaldehyde and an acid selected from the group consisting of acetic acid and propionic acid in the vapor phase at a temperature within the range from about 300° C. to about 500° C. in the presence of a catalyst selected from the group consisting of sodium aluminosilicates, potassium aluminosilicates, rubidium aluminosilicates, magnesium aluminosilicates, calcium aluminosilicates, strontium aluminosilicates, barium aluminosilicates, manganese aluminosilicates, cobalt aluminosilicates, zinc aluminosilicates, alkali metal hydroxides on aluminosilicates, alkaline earth metal hydroxides on aluminosilicates, alkali metal hydroxides on silica gel, alkaline earth metal hydroxides on silica gel, sodium silicate on silica gel, potassium silicate on silica gel, molybdenum oxide on silica gel, and silica gel, said alkali metal hydroxides being selected from the group consisting of sodium hydroxide, potassium hydroxide and cesium hydroxide, and said alkaline earth metal hydroxides being selected from the group consisting of calcium hydroxide and barium hydroxide, and the mol ratio of acid to formaldehyde being from about 5:1 to about 15:1, and recovering an unsaturated monocarboxylic acid from the reaction products.

2. A process according to claim 1 in which the temperature is in the range of 350 to 425° C.

3. A process according to claim 1 in which the space velocity of said vapor phase mixture of formaldehyde and an acid is in the range of about 100 liters per hour per liter of catalyst to about 6000 liters per hour per liter of catalyst.

4. A process according to claim 1 where the catalyst is a synthetic alkali metal aluminosilicate.

5. A process according to claim 1 where the catalyst is an alkali metal hydroxide on silica gel.

6. A process according to claim 1 where the catalyst is an alkaline earth metal hydroxide on silica gel.

7. A process according to claim 1 where the catalyst is synthetic barium aluminosilicate.

8. A process according to claim 1 where the catalyst is synthetic calcium aluminosilicate.

9. A process according to claim 1 where the catalyst is synthetic strontium aluminosilicate.

10. A process according to claim 1 where the catalyst is potassium hydroxide on silica gel.

11. A process according to claim 1 where the catalyst is rubidium hydroxide on silica gel.

12. A process according to claim 1 where the acid is acetic acid.

13. A process according to claim 1 where the acid is acetic acid and the unsaturated acid is acrylic acid.

14. A process according to claim 1 where the acid is propionic acid and the unsaturated acid is methacrylic acid.

15. A process as defined in claim 2, wherein the space velocity of the vapor-phase mixture of formaldehyde and acid is in the range of about 100 liters per hour per liter of catalyst to about 6000 liters per hour per liter of catalyst.

16. A process which comprises reacting formaldehyde and an acid selected from the group consisting of acetic acid and propionic acid in the vapor phase at a temperature within the range from about 300° C. to about 500° C. in the presence of a catalyst selected from the group consisting of sodium aluminosilicates, potassium aluminosilicates, rubidium aluminosilicates, magnesium aluminosilicates, calcium aluminosilicates, strontium aluminosilicates, barium aluminosilicates, manganese aluminosilicates, cobalt aluminosilicates, zinc alumionsilicates, alkali metal hydroxides on aluminosilicates, alkaline earth metal hydroxides on aluminosilicates, alkali metal hydroxides on silica gel, alkaline earth metal hydroxides on silica gel, sodium silicate on silica gel, potassium silicate on silica gel, molybdenum oxide on silica gel, and silica gel, said alkali metal hydroxides being selected from the group consisting of sodium hydroxide, potassium hydroxide and cesium hydroxide, and said alkaline earth metal hydroxide being selected from the group consisting of calcium hydroxide and barium hydroxide, said hydroxides being present in the amount of 0.5% to 10% by weight of the carrier, and the mol ratio of acid to formaldehyde being from about 5:1 to about 15:1, and recovering an unsaturated monocarboxylic acid from the reaction products.

17. A process which comprises reacting formaldehyde and an acid selected from the group consisting of acetic acid and propionic acid in the vapor phase at a temperature within the range from about 350° C. to 425° C. in the presence of a catalyst selected from the group consisting of sodium aluminosilicates, potassium aluminosilicates, rubidium aluminosilicates, magnesium aluminosilicates, calcium aluminosilicates, strontium aluminosilicates, barium aluminosilicates, manganese aluminosilicates, cobalt aluminosilicates, zinc aluminosilicates, alkali metal hydroxides on aluminosilicates, alkaline earth metal hydroxides on aluminosilicates, alkali metal hydroxides on silica gel, alkaline earth metal hydroxides on silica gel, sodium silicate on silica gel, potassium silicate on silica gel, molybdenum oxide on silica gel, and silica gel, said alkali metal hydroxides being selected from the group consisting of sodium hydroxide, potassium hydroxide and cesium hydroxide, and said alkaline earth metal hydroxides being selected from the group consisting of calcium hydroxide and barium hydroxide, said hydroxide being present in the amount of 0.5% to 10% by weight of the carrier and said mixture having a mol ratio of acid to formaldehyde of from about 5:1 to about 15:1, the space velocity of the vapor-phase mixture of formaldehyde and acid being in the range of about 100 liters per hour per liter of catalyst to about 6000 liters per hour per liter of catalyst, and recovering an unsaturated monocarboxylic acid from the reaction products.

References Cited by the Examiner
UNITED STATES PATENTS

| | | | |
|---|---|---|---|
| 3,051,747 | 8/1962 | Leathers et al. | 260—526 |
| 3,100,795 | 8/1963 | Frantz et al. | 252—455 |

FOREIGN PATENTS 847,370   6/1936   France.

OTHER REFERENCES

"Catalysis," 1940, Beckman Reinhold Publishing Corp., New York, New York.

LORRAINE A. WEINBERGER, *Primary Examiner.*

LEON ZITVER, *Examiner.*